United States Patent
Lu et al.

(10) Patent No.: US 11,276,393 B2
(45) Date of Patent: Mar. 15, 2022

(54) CHAT BOT REGISTRATION WITH SEARCH RESULTS INTEGRATION

(71) Applicant: Microsoft Technology Licensing, LLC, Redmond, WA (US)

(72) Inventors: Ling Lu, Redmond, WA (US); Marcelo De Barros, Redmond, WA (US); Rahul Lal, Redmond, WA (US); Saulo Santos, Redmond, WA (US); John Michael Guthmann, Redmond, WA (US); Abinash Sarangi, Redmond, WA (US); Shantanu Sharma, Redmond, WA (US); Dena Saunders, Redmond, WA (US); Ankit Kumar, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/621,224

(22) Filed: Jun. 13, 2017

(65) Prior Publication Data

US 2018/0330720 A1    Nov. 15, 2018

Related U.S. Application Data

(60) Provisional application No. 62/503,573, filed on May 9, 2017.

(51) Int. Cl.
*G10L 15/18* (2013.01)
*G06K 9/00* (2006.01)
(Continued)

(52) U.S. Cl.
CPC ...... *G10L 15/1815* (2013.01); *G06F 16/3322* (2019.01); *G06F 16/3329* (2019.01);
(Continued)

(58) Field of Classification Search
CPC .... G06F 9/453; G06F 17/30867; G06F 3/167; G06F 17/30554; G06F 16/9535;
(Continued)

(56) References Cited

U.S. PATENT DOCUMENTS 7,797,635 B1    9/2010 Denise
7,996,462 B2    8/2011 Degenhardt et al.
(Continued)

OTHER PUBLICATIONS

Kozhaya; 10 Steps to Train a Chatbot and its Machine Learning Models to Maximize Performance, Dec. 12, 2016; pp. 1-8 (Year: 2016).*
(Continued)

*Primary Examiner* — Tonia L Dollinger
*Assistant Examiner* — Linh T. Nguyen (57) ABSTRACT

Systems, methods, and computer-executable instructions for verifying a chat bot. Registration information for the chat bot is received that includes keywords. Queries are submitted to the chat bot and responses to the queries are received. The responses are classified using a classifier. Verification that the responses are classified as approved responses are done. The registration information is stored and the registration of the chat bot is completed based upon the verified responses. A search query that includes a search keyword is received. The search keyword is matched to the keywords associated with the chat bot. Search results that include a link to the chat bot that are based upon the search query are provided.

21 Claims, 9 Drawing Sheets

(51) Int. Cl.
    *H04M 3/493* (2006.01)
    *G06F 16/951* (2019.01)
    *G06F 16/332* (2019.01)
    *G06K 9/62* (2006.01)
    *G06F 16/9535* (2019.01)
    *G06N 3/00* (2006.01)
    *G06F 40/40* (2020.01)

(52) U.S. Cl.
    CPC ........ *G06F 16/951* (2019.01); *G06F 16/9535* (2019.01); *G06F 40/40* (2020.01); *G06K 9/00087* (2013.01); *G06K 9/6267* (2013.01); *G06N 3/004* (2013.01); *G06N 3/006* (2013.01); *H04M 3/493* (2013.01); *H04M 3/4936* (2013.01)

(58) Field of Classification Search
    CPC .. G06F 16/248; G06F 16/3326; G06F 16/435; G06F 16/583; G06F 21/552; G06F 40/35; G06F 16/3322; G06F 16/156; G06F 16/338; G06F 16/94; G06F 16/33; G06F 16/334; G06F 16/532; G06F 40/40; G06F 16/3329; G06F 16/24; G06F 16/90332; G06F 16/3338; H04L 43/50; G06N 99/005; G06N 5/022; G06N 5/02; G06N 3/004; G10L 15/063; G10L 15/26; G10L 25/48; G10L 15/08; G10L 15/1815; G06Q 10/06; G06Q 20/384; G06Q 30/0256; G06Q 30/0633; G06Q 30/0635; G06Q 20/386; G06Q 30/00; G06Q 30/0601; G06Q 50/10; G06Q 30/0253; G06Q 30/0613; G06Q 50/14; H04M 3/493; H04M 3/4936; G06K 9/00087
    USPC .............. 702/182, 108, 122, 62; 706/45, 46; 707/E17.014, 603, 706; 709/227, 230
    See application file for complete search history.

(56) References Cited

U.S. PATENT DOCUMENTS

| | | | | |
|---|---|---|---|---|
| 9,405,741 | B1* | 8/2016 | Schaaf | G10L 15/08 |
| 10,558,693 | B1* | 2/2020 | Elieson | G06F 16/84 |
| 10,839,432 | B1* | 11/2020 | Konig | G06Q 30/0281 |
| 10,853,430 | B1* | 12/2020 | Gau | G06F 16/9535 |
| 10,880,237 | B2 | 12/2020 | Anger et al. | |
| 2002/0095472 | A1* | 7/2002 | Berkowitz | H04L 65/4007 |
| | | | | 709/217 |
| 2006/0155513 | A1* | 7/2006 | Mizrahi | G06Q 30/02 |
| | | | | 702/179 |
| 2008/0177600 | A1* | 7/2008 | McCarthy | G06Q 10/0639 |
| | | | | 705/7.33 |
| 2009/0034851 | A1* | 2/2009 | Fan | G06K 9/6282 |
| | | | | 382/230 |
| 2009/0083232 | A1 | 3/2009 | Ives et al. | |
| 2009/0132500 | A1* | 5/2009 | Jones | G06F 17/30899 |
| 2009/0281966 | A1* | 11/2009 | Biggs | G06F 16/951 |
| | | | | 706/11 |
| 2010/0180217 | A1 | 7/2010 | Li | |
| 2011/0010382 | A1* | 1/2011 | D'Arcy | H04M 3/5166 |
| | | | | 707/769 |
| 2012/0041903 | A1* | 2/2012 | Beilby | G06N 3/004 |
| | | | | 706/11 |
| 2012/0221502 | A1* | 8/2012 | Jerram | G06Q 30/02 |
| | | | | 706/46 |
| 2014/0025477 | A1* | 1/2014 | Dimock | G06Q 30/0217 |
| | | | | 705/14.39 |
| 2014/0108583 | A1* | 4/2014 | Kulkarni | H04L 51/046 |
| | | | | 709/206 |
| 2014/0164296 | A1* | 6/2014 | Duan | G06N 5/04 |
| | | | | 706/11 |
| 2015/0106349 | A1* | 4/2015 | Kitamorn | G06F 17/30867 |
| | | | | 707/706 |
| 2015/0186156 | A1* | 7/2015 | Brown | G06F 3/04817 |
| | | | | 715/706 |
| 2015/0317395 | A1* | 11/2015 | Arkin | G06F 16/9535 |
| | | | | 707/706 |
| 2016/0299983 | A1 | 10/2016 | Guha | |
| 2016/0352657 | A1* | 12/2016 | Galley | H04L 12/58 |
| 2017/0099249 | A1* | 4/2017 | Kozareva | G06F 16/353 |
| 2017/0180284 | A1* | 6/2017 | Smullen | H04L 67/322 |
| 2017/0244652 | A1 | 8/2017 | Clarke | |
| 2017/0269972 | A1 | 9/2017 | Hosabettu et al. | |
| 2017/0324867 | A1 | 11/2017 | Tamblyn et al. | |
| 2017/0345079 | A1* | 11/2017 | Rangan | G06Q 30/0633 |
| 2018/0025085 | A1* | 1/2018 | Sarangi | G06F 3/0482 |
| 2018/0026919 | A1* | 1/2018 | Gau | G06F 9/453 |
| | | | | 709/206 |
| 2018/0131645 | A1 | 5/2018 | Magliozzi et al. | |
| 2018/0181558 | A1 | 6/2018 | Emery et al. | |
| 2018/0225365 | A1 | 8/2018 | Altaf et al. | |
| 2018/0302349 | A1* | 10/2018 | Ban | H04L 51/04 |
| 2018/0332167 | A1 | 11/2018 | Lu et al. | |

OTHER PUBLICATIONS

Kozhaya, 10 Steps to Train a Chatbot and its Machine Learning Models to Maximize Performance, Dec. 12, 2016, pp. 1-6 (Year: 2016).*
Kumar, Raj, "Register Bot with Microsoft Bot Framework", http://www.c-sharpcorner.com/article/register-bot-with-microsoft-bot-framework/, Published on: Jul. 1, 2016, 11 pages.
Casamento, Keith, "Chatting with LUIS", https://tutorials.botsfloor.com/chatting-with-luis-e7ec94b4e0de, Published on: Jan. 29, 2017, 9 pages.
"Build a conversational bot behavior", https://cerb.ai/guides/bots/conversational-bots/, Retrieved on: May 18, 2017, 17 pages.
Prae, Paul, "Azure as a Chatbot Service: From Purpose to Production with a Cloud Bot Architecture", https://www.slideshare.net/PaulPrae/azure-as-a-chatbot-service-from-purpose-to-production-with-a-cloud-bot-architecture, Published on: Jan. 20, 2017, 3 pages.
Shemesh, Mor, "Unit Testing for Bot Applications", https://www.microsoft.com/reallifecode/2017/01/20/unit-testing-for-bot-applications/. Published on: Jan. 20, 2017, 13 pages.
Matei, Radu, "How to build a Twitter Search Bot using Microsoft Bot Framework and Cognitive Services", https://radu.microsoft.pub.ro/how-to-build-a-twitter-search-bot-using-microsoft-bot-framework-and-cognitive-services/, Published on: Apr. 5, 2016, 23 pages.
Southern, Matt, "Bing to Integrate Chatbots into Search Results", https://www.searchenginejournal.com/bing-integrate-chatbots-search-results/197173/, Published on: May 8, 2017, 10 pages.
Boutin, Paul, "There's a Bot for That! A Search Engine for Finding Bots", https://chatbotsmagazine.com/theres-a-bot-for-that-a-search-engine-for-finding-bots-8a2c1145072b, Published on: Mar. 15, 2017, 2 pages.
"Non Final Office Action Issued in U.S. Appl. No. 15/621,457", dated Feb. 17, 2021, 25 Pages.
"Non Final Office Action Issued in U.S. Appl. No. 15/621,457", dated Jul. 23, 2020, 31 Pages.
"Final Office Action Issued in U.S. Appl. No. 15/621,457", dated Jun. 25, 2021, 28 Pages.
Kohler, Che, "Bing Introduces Chat Bot For Local Searches", Retrieved from: https://www.nichemarket.co.za/blog/bing-introduces-chat-bot-for-local-searches/, Retrieved Date: Jun. 7, 2018, 08 Pages.
"International Search Report and Written Opinion Issued in PCT Application No. PCT/US18/028717", dated Jun. 19, 2018, 11 Pages.
"Final Office Action Issued In U.S. Appl. No. 15/621,457", dated Nov. 18, 2020, 31 Pages.
"Summons to Attend Oral Proceedings Issued in European Patent Application No. 18723244.2", Mailed Date: Apr. 15, 2021, 7 Pages.
"Office Action Issued in European Patent Application No. 18723244.2", dated Sep. 2, 2020, 6 Pages.

(56) References Cited

OTHER PUBLICATIONS

"Callback (Computer Programming)", Retrieved From: https://en.wikipedia.org/w/index.php?title=Callback_(computer_programming)&oldid=707441498, Feb. 28, 2016, 6 Pages.

"Office Action Issued in European Patent Application No. 18723244.2", dated Sep. 7, 2021, 9 Pages.

* cited by examiner

FIG. 1

Configure Your Bot — 210

- EMAIL
- TELEPHONE
- COMPANY DETAILS
- COMPANY NAME
- COMPANY PHONE
- COMPANY WEBSITE
- BOT CATEGORY
- TAGS FOR YOUR BOT — 212

DONE

CHAT BOT REGISTRATION WITH SEARCH RESULTS INTEGRATION

PRIORITY CLAIM

This application claims priority to U.S. Provisional Patent Application Ser. No. 62/503,573 filed May 9, 2017, entitled "CHAT BOTS WITHIN SEARCH RESULTS," which is incorporated herein by reference in its entirety.

BACKGROUND

Chat bots provide a way for users to ask questions using natural language. A search engine provider may add chat bots developed by the search engine provider. These chat bots may be integrated into search results to enhance the search experience. Using chat bots from third parties have complications as the search engine provider does not control third party chat bots. Insurances that a third-party chat hot is operating to the rules and/or policies of the search engine provider may be needed.

DETAILED DESCRIPTION

Chat bots may be useful to answer questions using natural language. In addition, the input into a chat bot may be used to augment a search experience, such as by updating search results, suggesting additional searches, etc. A search engine provider may add chat bots developed by the search engine provider to enhance the search experience. In addition, an external company may have produced its own chat bot which may also be integrated into search results. These chat bots may be selected and integrated into a search results page. Within that context the user may engage with the chat bot, which may be a third-party chat bot, without navigating away from the search engine results page.

Chat bots may enhance the search results page with or without user interaction. For example, search results may be refreshed after a user clicks on a given query or link from within a chat bot. In another example, search engine results may be refreshed automatically based on the context of the conversation within the chat bot. These refreshes may happen automatically in the background.

Using third-party chat bots introduces some risk if a chat bot behaves unpredictably in a real-world environment of mixed input information, especially with the ability of self-learning from the conversation. Limiting what information users may send to a chat bot may limit the performance of the chat bot. The behavior of the chat bot may be monitored to prevent a chat bot from behaving against some set of rules. As part of registration or in an ongoing manner, a chat bot may be sent a set of queries/input and the response from the chat bot may be validated. For example, typical queries may be sent to the chat bot and the responses sent to one or more classifiers. The classifiers may determine if a response is adult nature, racy, offensive, etc. In addition, another set of queries may be sent that include adult language, racy language, etc., and those responses may be sent to the classifiers. The queries may also be sent to the classier. In an example, the adult language, racy, etc. portions of the query may be stripped or removed before providing to the classifier. In an example, the classifier may remove the query words or a subset of the query words from the responses before classifying the response. For example, a curse word may be included in a query and repeated in the response. The curse word may be filtered from both the query and the response before providing to the classifier. If any chat bot is determined to be a "bad bot" based upon the returned classifier data, the chat bot may be blocked from being returned as part of the search engine results page.

Classifiers may be employed post-registration as well. For example, classifiers may be used to monitor currently running chat bots. The same queries used for testing chat bots during registration may be used. In an example, responses from real time queries may be used. The monitoring may happen periodically. For example, the monitoring may occur at a predefined time or after certain number of launches of a chat bot. The table below summarizes some classifiers and how they may be implemented. For example, some classifiers may be implemented using machine learned classifier models, javascript, etc.

| Area | Descrption | Implementation |
| --- | --- | --- |
| Adult | Sexually explicit content or references including websites, links, images, videos | Classifiers via Cognitive API |
| Racy | Suggestive or stimulating butnot outright explicit | Classifiers via Cognitive API |
| Offensive | Derogatory, objectionable terms, etc. | Classifiers via Cognitive API |
| Malware | Links that download harmful software | OneIndicator API |
| Phishing | Links that go to portals that take infinancial or personal account information | OneIndicator API |
| SPAM | Click baits, links making user send/post/write something surreptitiously | Java Script |
| Alive? | Check that the bot is alive and responsive | Classifiers |

Figure 1:
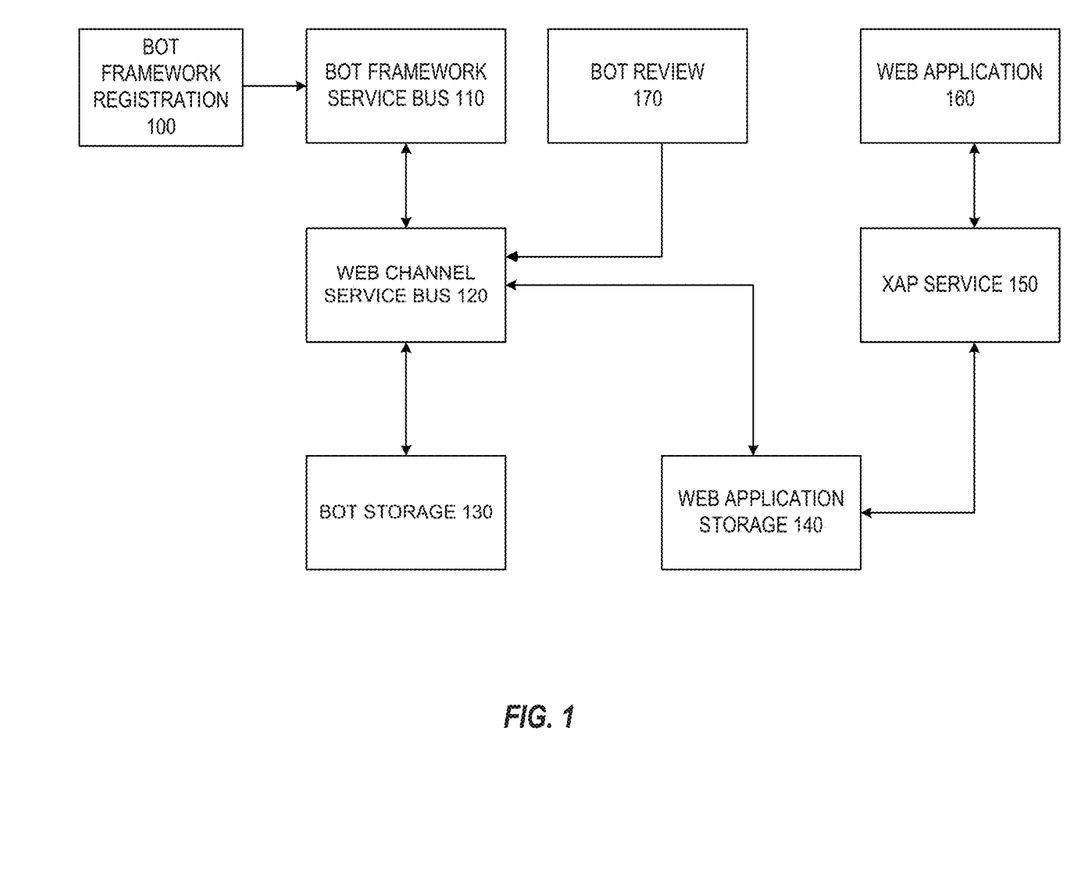
FIG. 1 is a block diagram of a system for chat bot registration in accordance with respective examples.
Figure 2:
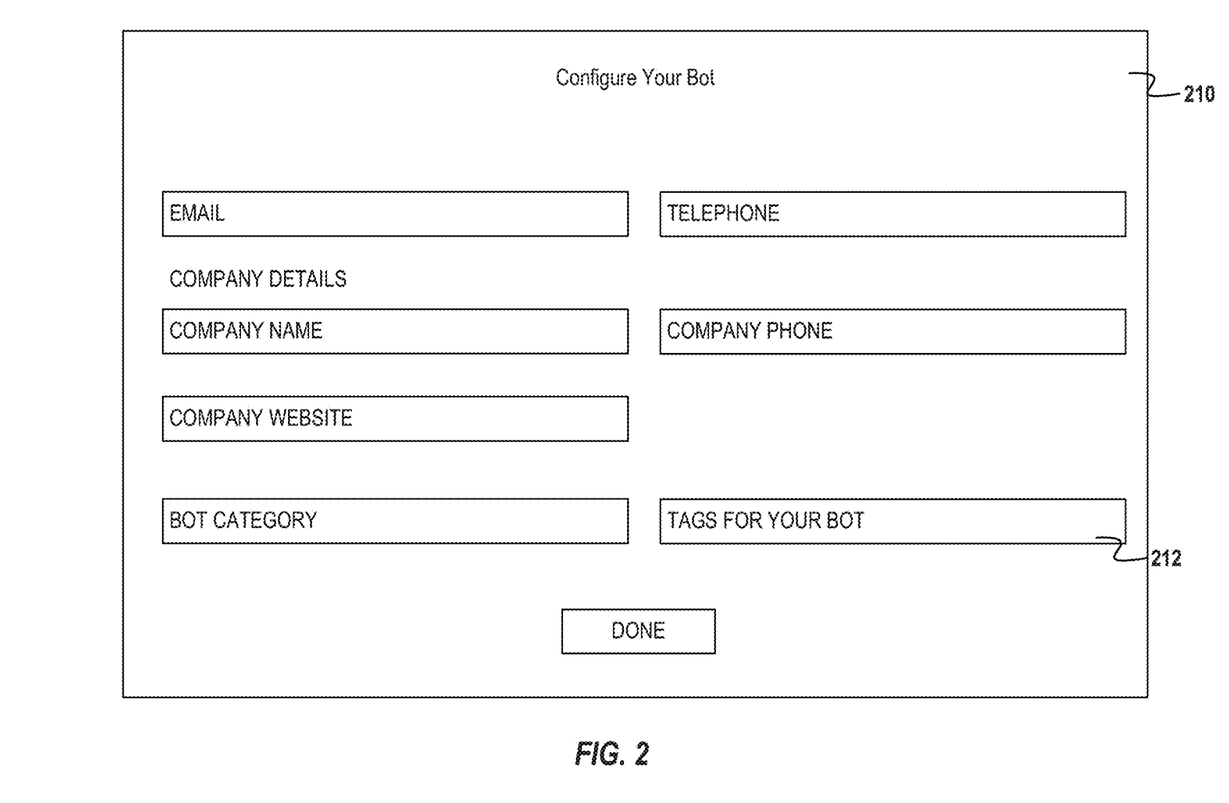
FIG. 2 is an illustration of a chat hot registration page in accordance with respective examples.

FIG. 1 is a block diagram of a system for chat bot registration in accordance with respective examples. A chat bot may be registered with a web application 160 using a bot framework registration 100. The bot framework registration 100 may collect registration information regarding a chat bot that is seeking to be registered with the web application. The registration information may be collected via a web page. FIG. 2 is an illustration of a chat bot registration page 210 in accordance with respective examples. The registration page includes input fields to collect an email, a telephone number, a company name, a company phone, and a company website associated with a chat bot. Tags/keywords 212 that are associated with the chat bot may be collected as part of the registration information. In addition, a category that the chat bot is associated with may also be collected.

In an example, user queries are matched against the tags to determine if the chat bot should be returned in the search engine results. The registration information may also include a chat bot category. A chat bot may be provided by and registered by third party entities, that are not associated with the operator of the search platform. In addition, the chat bot may be integrated into search results provided by a search engine while the chat bot hosted and use data services at a third-party location. In an example, a group of chat bots that belong to the same category may also be returned. For example, a search for "travel bots" may return multiple chat bots that are associated with the travel category of chat bots.

The registration information and the chat bot may be passed through a bot framework service bus 110. The bot framework service bus 110 may verify the registration information. In an example, a bot review 170 service may be used to verify the registration information. As described above, classifier may be used to review chat bot results. These classifiers may be used by the bot review 170 service. A web channel service bus 120 may then receive the registration information and determine where to store the registration data. The bot framework service bus 110, the web channel service bus 120, or the bot review 170 service may verify the chat bot. For example, predefined queries may be sent to the chat bot and the responses to these queries collected. The collected responses may be sent to one or more classifiers. The classifiers determine if the responses match an area that may disqualify the chat bot. For example, classifiers for adult material, racy, offensive, malware, phishing, spam, and is the bot alive may be used. In an example, the predefined queries may be a list of initial questions to chat bots. For example, "hello"; "help"; "terms of service"; etc. may be sent to the chat bot and the responses collected and classified. In an example, the predefined queries may contain material that would be classified into one of the areas. For example, queries could be racy, offensive, or adult nature. These responses could also be passed through the classifiers. In an example, the queries may be used to remove words from the chat bot responses before being passed to the classifiers.

If the responses from the chat bot are classified in an inappropriate area, the chat bot may be disqualified from registering with the web application 160. The owner of the chat bot may be contacted with information, such as the queries and responses, indicating that the chat bot failed a classifier.

Chat bots may be stored in a hot storage 130. The registration information or parts of the registration information may be stored in the hot storage 130 or a web application storage 140. For example, the tags associated with a chat bot may be stored in the web application storage.

In an example, the web application 160 is a search engine. The search engine receives a query and may interact with a Silverlight application package (XAP) service 150 to process the query. The XAP service 150 may interact with the web application storage 140 to determine the search results for the query. In an example, other content frameworks may be used. The XAP service 150 may determine that one or more chat bots should be included in the search results. For example, the search query may be used to match against the chat hot tags that were supplied as part of the chat hot registration. In an example, the chat bot that is included in the search results is a third-party chat bot that was success-fully registered, including passing through the various classifiers. Chat bots may include text and/or voice input and outputs.

In an example, when a chat bot is matched to be returned in the search results, the XAP service 150 may determine if the chat bot is launchable from within the search results. The registration information may provide an indication whether a chat bot is launchable. If the chat bot is launchable, the chat bot may be included within the search results. In an example, the chat bot may be provided within a rich answer. In an example, to be included within a rich answer, the search query may have a strong intent for the results to include chat bots. For example, a search query for "travel bots" may signal a strong intent for chat bots based upon the use of the term "bots" within the search query. The rich answer may include information on a chat bot such as a description of the chat bot, an icon, a chat button, and an add chat hot button to a user's bot list. When the chat button is selected, the chat bot may be launched. In an example, the chat bot is a third-party chat bot that is launched within the search engine without the user navigating from the search engine results page.

Figure 3:
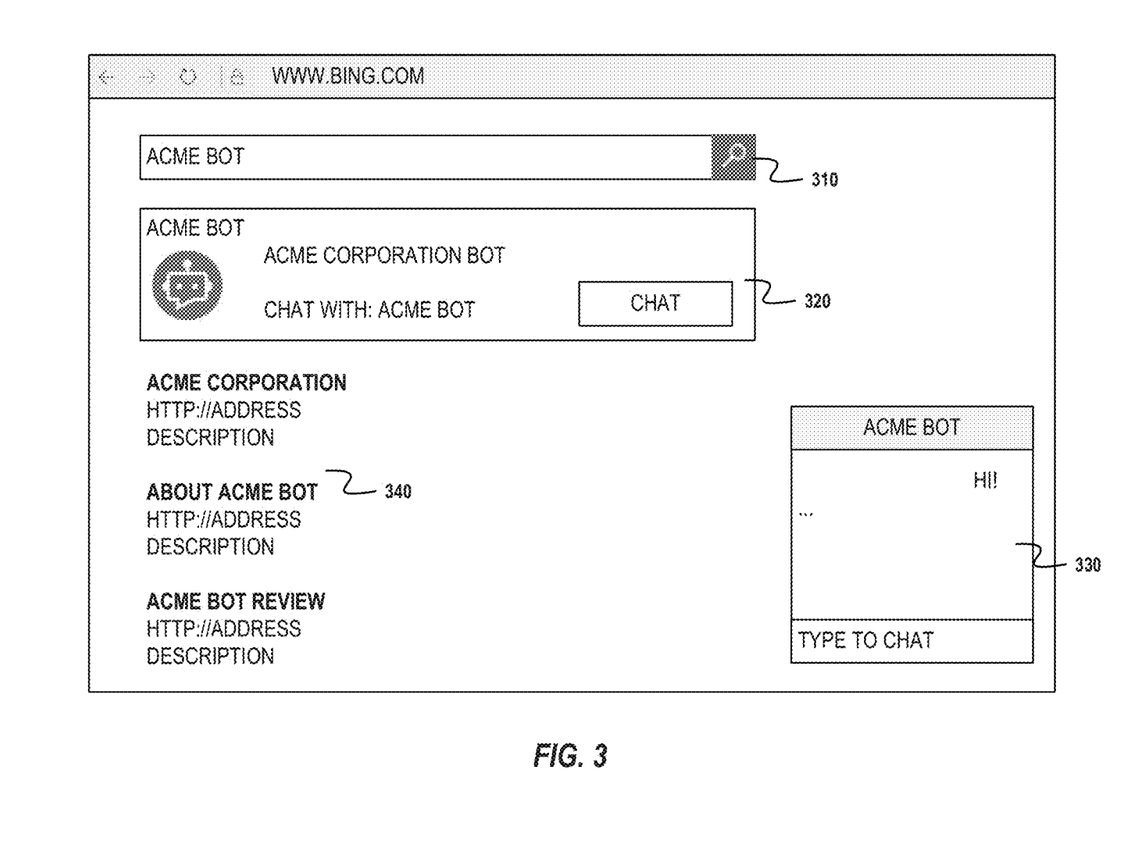
FIG. 3 is an illustration of a search engine results page including a chat hot result in accordance with respective examples.

FIG. 3 is an illustration of a search engine results page including a chat bot result in accordance with respective examples. A search engine may receive a search query 310. The search query 310 may be parsed by the search engine to determine if the search query 310 is directed to chat bots. In the example, the search query 310 "ACME BOT" may be identified as a chat bot search query based upon the inclusion of the term "BOT" in the search query 310. The search engine may search the chat bot registration information for chat bots associated with "ACME." Finding an ACME chat bot, a rich result 320 identifying and providing an interface to the ACME chat bot may be included in the search results. The rich result 320 supplements normal web search results 340. As part of the rich result 320, a chat button may be selected to launch the ACME chat bot. In an example, the search engine or the XAP service 150 may receive an indication to launch the ACME chat bot after the chat button is selected. The ACME chat bot interface 330 may then be launched within the search engine results page without navigating the user away from the search engine results page. After launching, a user is able to submit queries/questions to the ACME chat bot and receive relevant answers.

In an example, a chat bot may be attached to search results. For example, the uniform resource locator (URL) of search results may be used to find relevant chat bots. During the chat bot registration, the chat bot may be associated with a URL. The chat bot's associated URL may be matched with the URL of the search results. For example, the entire URL, the domain of the URL, or a portion of the domain may be matched against the search results. In an example, only the first n search results are matched against chat bot URLs. If a match is found, the chat bot may be attached to the search result. In an example, if a match is found the chat bot may be included in a rich answer within the search results. This process allows for chat bots to be returned as part of organic search results, which helps users discover available chat bots.

The search results may be augmented based upon the chat bot. For example, a chat bot may receive an indication that a link within the chat bot was clicked. The chat bot may provide this indication to the web application. The XAP service may use this indication to refine a user's initial query and provide updated search results. In another example, the indication may be used to create a new search whose results replace or are added to the original search results.

In an example, when a chat bot is placed within search results, the search engine results page may register events to listen to the chat bot's activity. When an event is received from a chat bot, the search engine results page may provide that event to the web application. Example events include, but are not limited to, a user clicking on a chat bot element that contains an action to interact with the search results; trigger words within the conversation of the chat bot; etc. The trigger words may originate with the user's input or from the chat bots output. Some events do not require a user's action to intend to update the search results. The update may occur without the user's intent such that the search results page is updated automatically from the user's perspective.

Figure 4:
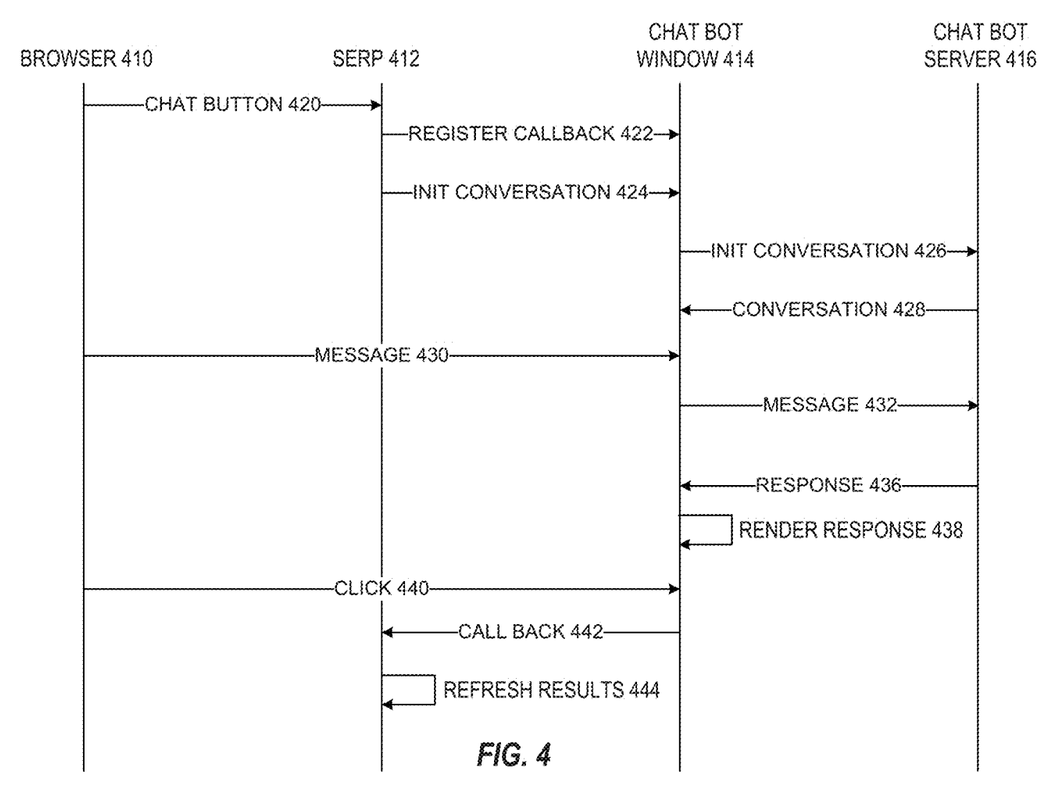
FIG. 4 is a flow diagram of refreshing a search engine results page based on a chat bot payload in accordance with respective examples.
Figure 5:
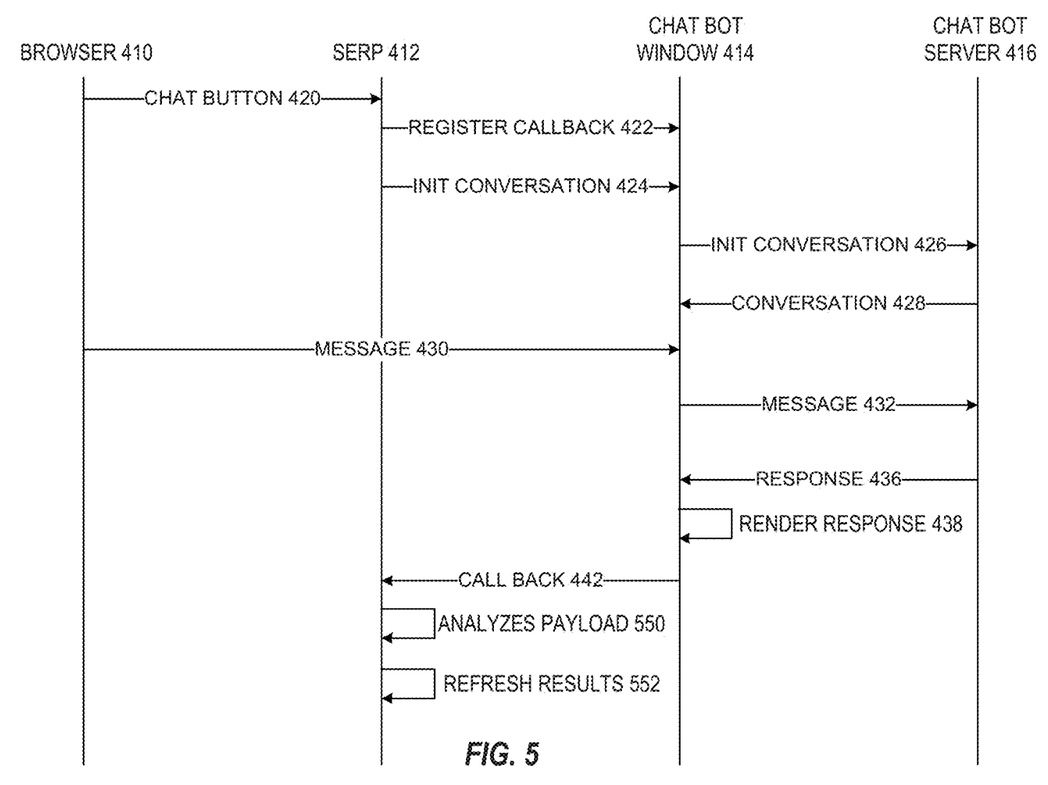
FIG. 5 is a flow diagram of refreshing a search engine results page based on a chat bot response payload in accordance with respective examples.
Figure 6:
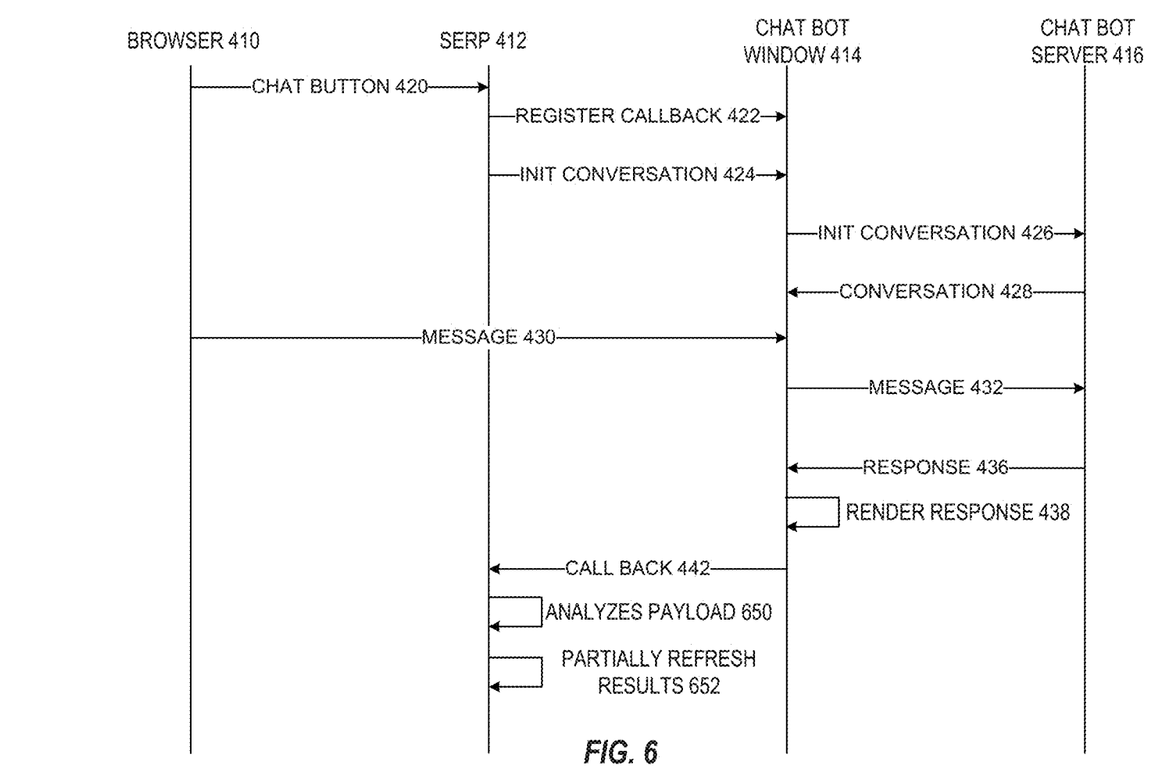
FIG. 6 is a flow diagram of partially refreshing a search engine results page based on a chat bot response payload in accordance with respective examples.

The web application may update the search results with results from a brand new query; may replace/update a portion of the results on the current search engine results page; and/or refresh a portion of the search engine results page such as a carousel. FIGS. 4-6 illustrate how a search engine results page may be updated based upon interactions with a chat bot.

FIG. 4 is a flow diagram of refreshing a search engine results page based on a chat bot payload in accordance with respective examples. A browser 410 may submit a search query to a search engine. In response, the search engine may create a search engine results page (SERP) 412 based upon the user's query. As described above, links to one or more chat bots may be included within the SERP 412. A chat bot may be launched from the SERP 412 based upon the browser 410 providing an indication that a chat button 420 was selected. In an example, the chat button 420 may be a hyperlink or other selectable user input control. Upon selecting the chat bot launch input, a chat bot window 414 may be launched within the browser 410. The SERP 412 may also register call backs 422 with the chat bot window. The callbacks allow the chat bot window 414 to communicate with the SERP 412. For example, the callbacks may allow the chat bot window 414 to send an indication of user input back to the search engine. The search engine may then update the SERP 412. Once the chat bot t window 414 is launched and the callbacks are registered, the SERP 412 can indicate the conversation may be begin 424. The chat bot window 414 may communicate with a chat bot server 416 to start a chat bot conversation 426. The chat bot server 416 may provide an initial conversation 428. The initial conversation 428 may be displayed within the chat bot window 414 and may provide a user with an introductory message regarding the chat bot. A user may enter a message or question in the browser 410. The browser 410 may send the message 430 to the chat bot window 414. The chat bot window 414 may pass the message to the chat bot server 432.

The chat bot server 416 may respond with a response 436. The response may be rendered 438 in the chat bot window 414. In an example, the response may include a hyperlink to additional material. For example, a user interacting with an encyclopedia chat bot may be provided with a link to additional information regarding a subject. The browser 410 may receive a click on the link and provide the click 440 to the chat bot window 414. Using the registered callbacks, the chat bot window 414 may provide an indication that a link has been clicked 442 to the SERP 412. The SERF 412 may then send an indication of the clicked link to a search engine. The search engine may process the clicked link and determine the initial search results should be updated. The search engine may send updated search results to the SERP 412 which may then refresh the currently displayed search results 444.

As an example, a user may initially do a search asking for airfare to a particular location. In response, the search results may include links to travel sites as well as a link to a travel chat bot. Clicking the link to the travel chat bot may launch the travel bot within the SERP 412. The travel chat bot may be passed the user's initial query and initiate conversation by confirming the user is searching for airfare from the user's location to the particular location. In an example, the user's location may be based upon user configuration data that may also be passed to the travel chat bot when the conversation is initialized. The particular location may be parsed from the user's search query.

The user may confirm both the destination and the originating location. The travel chat bot may confirm the requested dates of travel. Upon receiving this information, the travel chat bot may provide a response that includes prices for the airfare for the user. In addition, the response may also include a link to available hotels. When this link is clicked, the chat bot window 414 may receive an indication that the hotel link has been selected. The chat bot window 414 may provide an indication to the SERP 412 that the hotel link was selected. In an example, the payload passed to the SERP 412 as part of the call back may include the selected link, relevant dates, and search keywords. The SERP 412 may use the provided keywords to do a new query with the search engine. The search engine may provide results for the hotel keyword search. These results may replace the original search results within the SERP 412. In an example, the hotel keyword search results may supplement the original search results without fully replacing the original search results. For example, the top three original search results may be kept and the hotel keyword search results may replace lower ranking original search results.

In another example, a message may be sent from the SERP 412 to the chat bot window 414 using the registered callbacks. Continuing with the above example, the SERP 412 may include results of various airlines. The chat bot window 414 may include a listing of various airfares from different airlines. If the user selects a specific airline in the SERP 412, the chat bot window 414 may be provided with the selected link, the title of the corresponding webpage, etc. The chat bot window 414 may pass this information to the chat bot server 416. The chat bot server 416 may parse the received data and determine the user is interested in a particular airline. The chat bot server 416 may then provide a new response to the chat bot window 414 that provides a listing of airfares for only the airline associated with the selected link. In another example, the chat bot server 416 may determine other airlines have lower airfare and provide a response that highlights the lower airfare on different airlines.

FIG. 5 is a flow diagram of refreshing a search engine results page based on a chat bot response payload in accordance with respective examples. The message flow to launch the chat bot window 414 in FIG. 5 is similar to the message flow shown in FIG. 4. The callback 442 in FIG. 5 includes a payload. The payload may include the text of the response from the chat bot server 416. The payload may also include the message from the browser 410. Upon receipt, the payload may be analyzed 550 by the SERP 412. Based upon the payload, the SERP 412 may determine the search results should be updated automatically. For example, the user may provide dates or locations to the chat bot window 414 that are different from the original dates or locations. The SERP 412 may detect this change between the original search and the user input in the payload. Upon detection, the SERP 412 may submit a new query that includes the updated dates or locations to the search engine. The results from the search engine may then be used to refresh 552 the SERP 412. In an example, the entire SERP 412 may be updated based upon the updated search.

FIG. 6 is a flow diagram of partially refreshing a search engine results page based on a chat bot response payload in accordance with respective examples. The message flow to launch the chat bot window 414 in FIG. 6 is similar to the message flow shown in FIG. 4. The call back 442 in FIG. 6 includes a payload. The payload may include the text of the response from the chat bot server 416. The payload may also include the message from the browser 410. Upon receipt, the payload may be analyzed 650 by the SERP 412. Based upon the payload, the SERP 412 may determine the search results should be updated. For example, the user may request tourist information regarding the destination. The SERP 412 may detect the user is requesting additional information. Using the additional information, the SERP 412 may construct a query. The query may be passed to the search engine that provides the results to the query. The results may update portions 652 of the SERP 412. For example, portions of the search results may be updated. In another example, advertisements or carousels may be updated with results relevant to the requested tourist information.

Figure 7A:
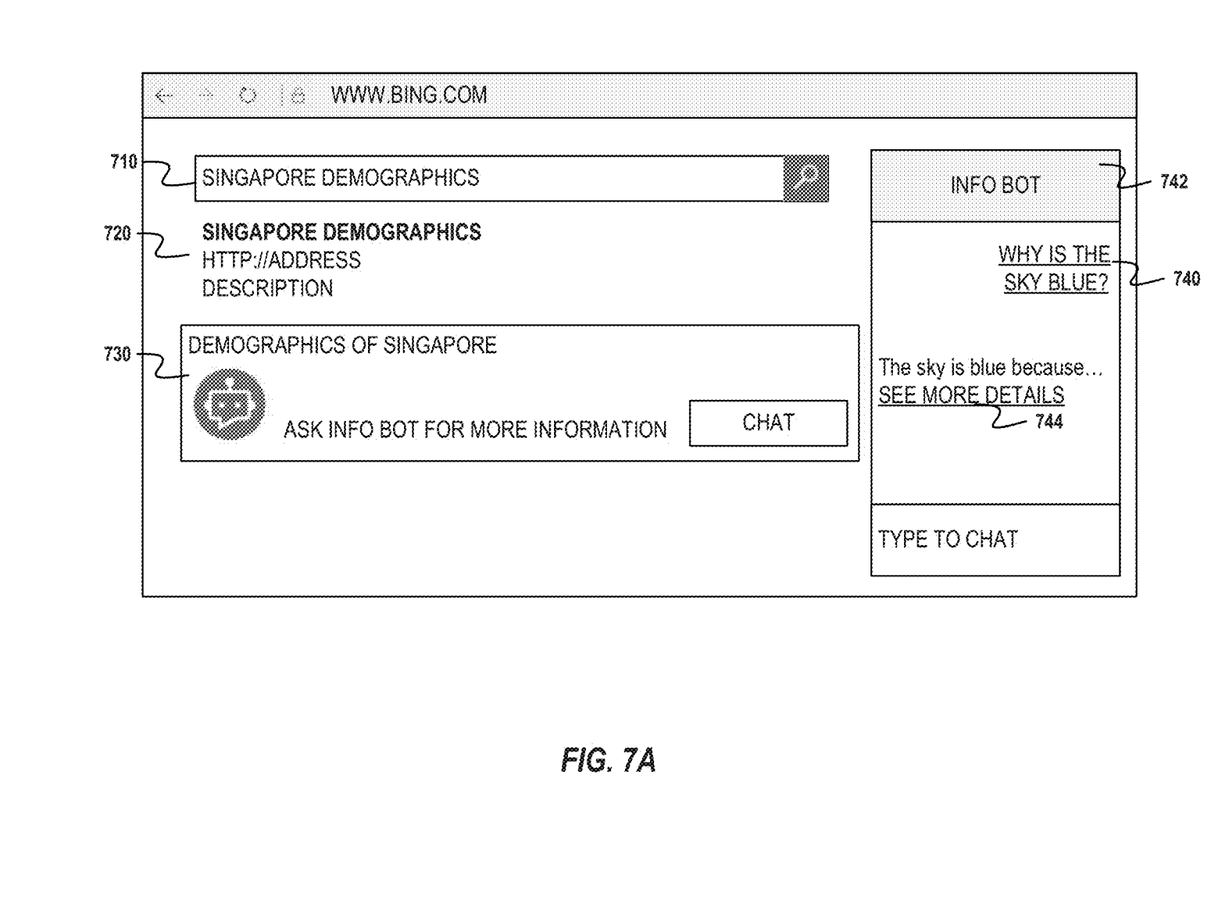
FIGS. 7A-7B are illustrations of refreshing a search engine results page based on a chat bot response payload in accordance with respective examples.
Figure 7B:
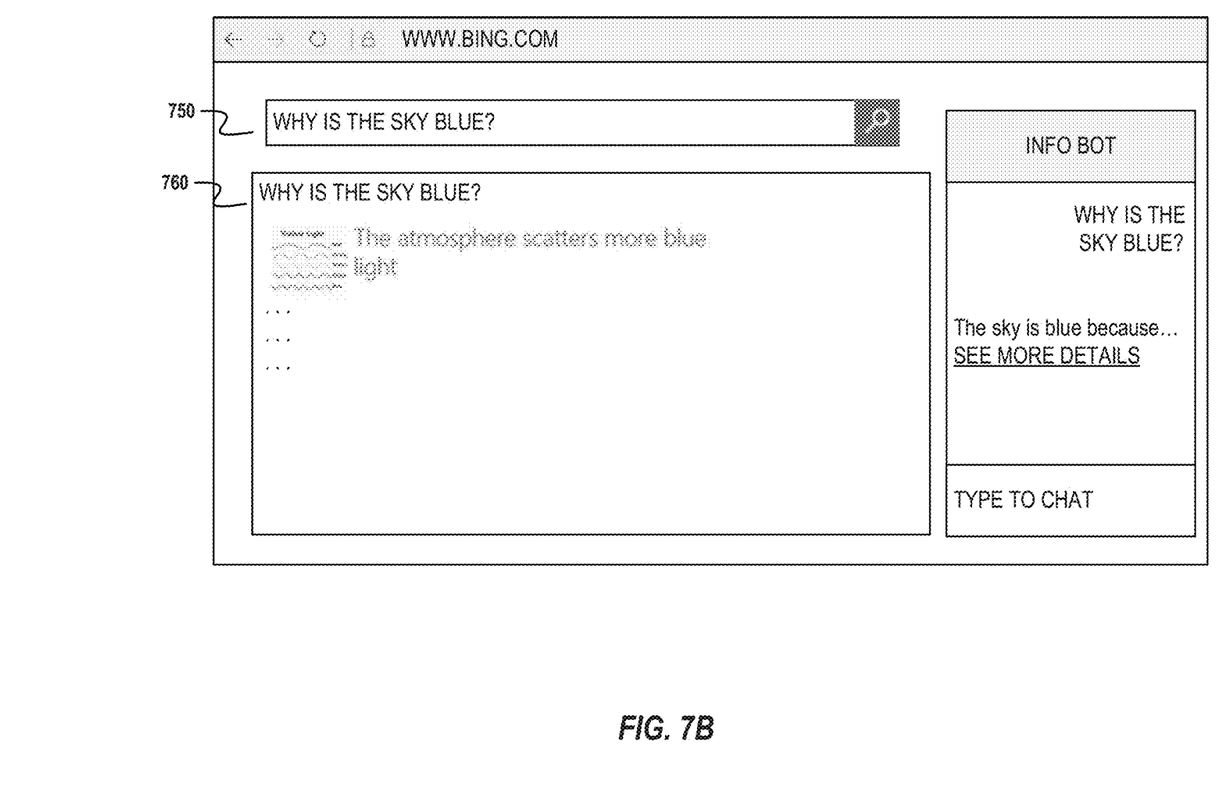

FIGS. 7A-7B are illustrations of refreshing a search engine results page based on a chat bot response payload in accordance with respective examples. A search query 710 is provided to a search engine via a user input from a search engine site. The search engine searches for web results 720 and chat bot results 730. Using the found items, the search engine results page is constructed and sent to the browser. The search engine results page includes the web search results 720 and the chat bot result 730 that includes a link to an information chat bot 742 that can answer additional information regarding demographics of Singapore. A chat button may be used to launch the information chat bot 742. The information chat bot 742 is able to answer various questions including questions unrelated to the original information, e.g., Singapore demographics. A user may enter a question 740 asking why the sky is blue. An answer may be provided, along with a link 744 for additional details.

When the link 744 is clicked, the search engine results page may be updated. In FIG. 7B, the search engine results page is seen after the search engine results page receives an indication from the information chat hot 742 that the link 744 was selected. The search engine results page, may then submit a new query to the search engine based upon the link. In this example, the search query may be the question that was provided by the user. The search engine responds with search results based upon the query. The search engine results page may then update the search results 760 with the new search results. In addition, the search engine results page may update a search query input 750 to reflect the search results 760 are based upon the new query. The information chat bot 742 may still be active and continue to respond to user input. In addition, as described above the search engine results page may continue to change based upon the chat bot input and responses.

Figure 8:
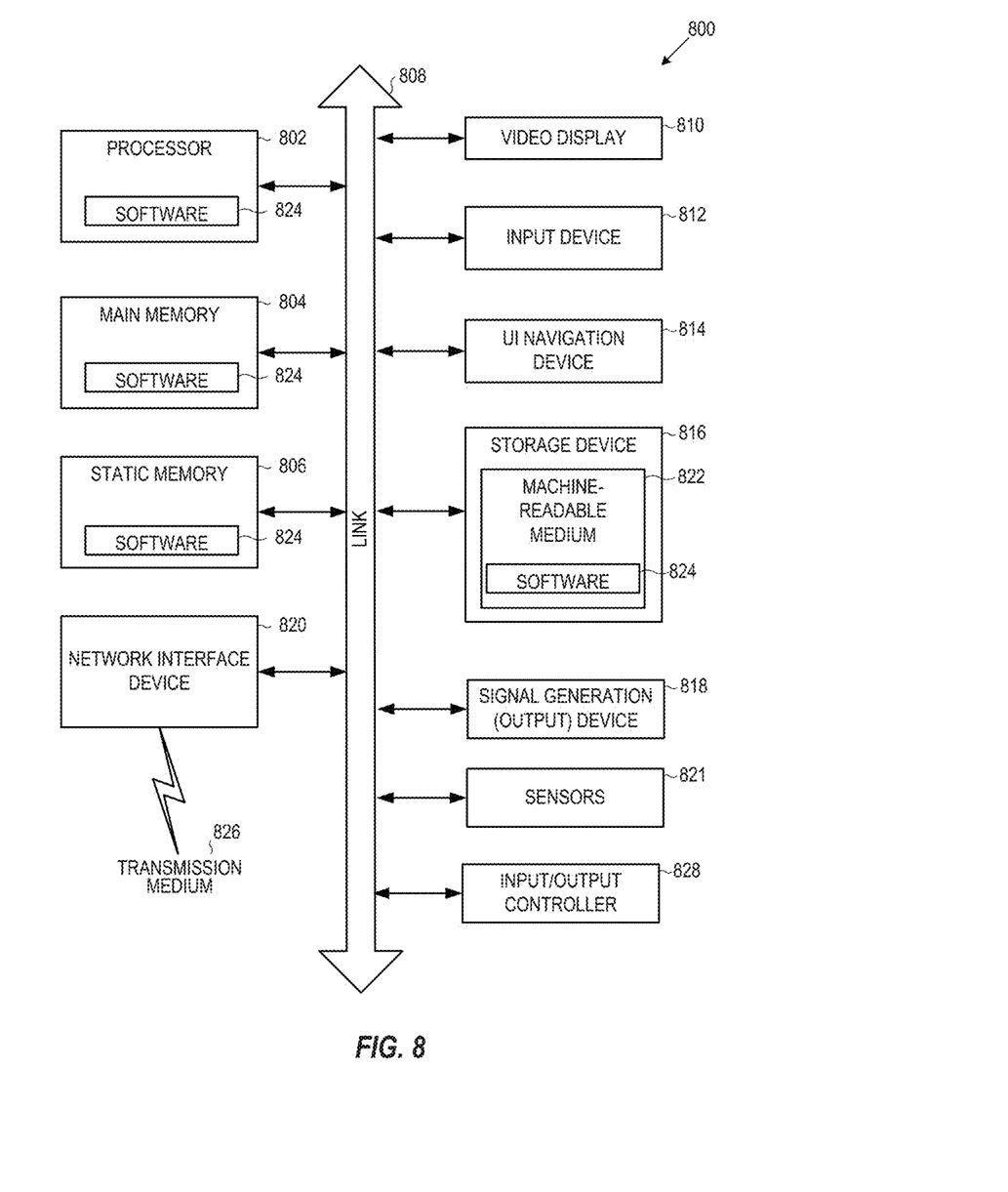
FIG. 8 is an example computing device that can be used in conjunction with the technologies described herein.

FIG. 8 is an example computing device that can be used in conjunction with the technologies described herein. In alternative embodiments, the computing device 800 may operate as a standalone device or may be connected (e.g., networked) to other computing devices. In a networked deployment, the computing device 800 may operate in the capacity of a server communication device, a client communication device, or both in server-client network environments. In an example, the computing device 800 may act as a peer computing device in peer-to-peer (P2P) (or other distributed) network environment. The computing device 800 may be a personal computer (PC), a tablet PC, a set top box (STB), a personal digital assistant (PDA), a mobile telephone, a smart phone, a web appliance, a network router, switch or bridge, or any computing device capable of executing instructions (sequential or otherwise) that specify actions to be taken by that computing device. Further, while only a single computing device is illustrated, the term "computing device" shall also be taken to include any collection of computing devices that individually or jointly execute a set (or multiple sets) of instructions to perform any one or more of the methodologies discussed herein, such as cloud computing, software as a service (SaaS), other computer cluster configurations.

Computing device 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The computing device 800 may further include a display unit 810, an input device 812 (e.g., a keyboard), and a user interface (UI) navigation device 814 (e.g., a mouse). In an example, the display unit 810, input device 812, and UI navigation device 814 may be a touch screen display. In an example, the input device 812 may include a touchscreen, a microphone, a camera (e.g., a panoramic or high-resolution camera), physical keyboard, trackball, or other input devices.

The computing device 800 may additionally include a storage device (e.g., drive unit) 816, a signal generation device 818 (e.g., a speaker, a projection device, or any other type of information output device), a network interface device 820, and one or more sensors 821, such as a global positioning system (GPS) sensor, compass, accelerometer, motion detector, or other sensor. The computing device 800 may include an input/output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.) via one or more input/output ports.

The storage device 816 may include a computing-readable (or machine-readable) storage media 822, on which is stored one or more sets of data structures or instructions 824 (e.g., software) embodying or utilized by any one or more of the techniques or functions described herein. In an example, at least a portion of the software may include an operating system and/or one or more applications (or apps) implementing one or more of the functionalities described herein. The instructions 824 may also reside, completely or at least partially, within the main memory 804, within the static memory 806, and/or within the hardware processor 802 during execution thereof by the computing device 800. In an example, one or any combination of the hardware processor 802, the main memory 804, the static memory 806, or the storage device 816 may constitute computing device (or machine) readable media.

While the computer-readable storage media 822 is illustrated as a single medium, a "computer-readable storage media" or "machine-readable storage media" may include a single medium or multiple media (e.g., a centralized or distributed database, and/or associated caches and servers) configured to store the one or more instructions 824.

In an example, a computer-readable storage media or machine-readable storage media may include any medium that is capable of storing, encoding, or carrying instructions for execution by the computing device 800 and that cause the computing device 800 to perform any one or more of the techniques of the present disclosure, or that is capable of storing, encoding or carrying data structures used by or associated with such instructions. Non-limiting computer-readable storage media examples may include solid-state memories, and optical and magnetic media. Specific examples of computer-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and optical media disks. The computer-readable storage media is non-transitory in that the storage media does not consist of transitory propagating signals.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 302.3 family of standards known as Wi-Fi®, IEEE 302.16 family of standards known as WiMax®), IEEE 302.15.4 family of standards, a Long Term Evolution (LTE) family of standards, a Universal Mobile Telecommunications System (UMTS) family of standards, peer-to-peer (P2P) networks, among others. The network interface device 820 may use the transfer protocols to transmit data using transitory propagating signals.

In an example, the network interface device 820 may include one or more physical jacks (e.g., Ethernet, coaxial, or phone jacks) or one or more antennas to connect to the communications network 826. In an example, the network interface device 820 may include one or more wireless modems, such as a Bluetooth modem, a Wi-Fi modem or one or more modems or transceivers operating under any of the communication standards mentioned herein. In an example, the network interface device 820 may include a plurality of antennas to wirelessly communicate using at least one of single-input multiple-output (SIMO), multiple-input multiple-output (MIMO), or multiple-input single-output (MISO) techniques. In some examples, the network interface device 820 may wirelessly communicate using Multiple User MIMO techniques. In an example, a transmission medium may include any intangible medium that is capable of storing, encoding or carrying instructions for execution by the computing device 800, and includes digital or analog communications signals or like communication media to facilitate communication of such software.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

The above description is intended to be illustrative, and not restrictive. For example, the above-described examples (or one or more aspects thereof) may be used in combination with others. Other embodiments may be used, such as by one of ordinary skill in the art upon reviewing the above description. Further, the following claims are hereby incorporated into the Detailed Description, with a claim standing on its own as a separate embodiment. The scope of the embodiments disclosed herein is to be determined with reference to the appended claims, along with the fill scope of equivalents to which such claims are entitled.

The invention claimed is:

1. A method for verifying a chat bot, the method comprising:
   receiving registration information for registering a chat bot with a search engine, the registration information comprising keywords;
   submitting predefined queries to the chat bot;
   receiving responses to the predefined queries from the chat bot;
   classifying the responses using a classifier to determine whether the responses match an inappropriate area that would disqualify the chat bot from registration;
   upon verifying that the responses are classified as approved responses rather than being classified in an inappropriate area, registering the chat bot with the search engine by storing the registration information and completing registration of the chat bot based upon the verified responses;
   after registering the chat bot, classifying one or more subsequent responses from the registered chat bot to real-time user queries to determine whether the subsequent responses match the inappropriate area;
   receiving, at the search engine, a search query with a search keyword;
   matching the search query to the keywords associated with the registered chat bot;
   in accordance with a determination that the subsequent responses do not match the inappropriate area:
      providing, by the search engine, search results based upon the search query, the search results including the link to the registered chat bot, and
      upon user selection of the link, launching the registered chat bot; and
   in accordance with a determination that the subsequent responses match the inappropriate area, preventing the registered chat bot from being included in search results provided by the search engine.

2. The method of claim 1, wherein the method further comprises providing the predefined queries to the classifier to classify the responses.

3. The method of claim 2, wherein the predefined queries include a word objectionable to the classifier.

4. The method of claim 3, wherein the method further comprises removing the word from the predefined queries before providing the predefined queries to the classifier.

5. The method of claim 3, wherein the method further comprises removing the word from the responses before providing the responses to the classifier.

6. The method of claim 4, wherein the word is a curse word.

7. The method of claim 1, wherein classifying responses from the chat bot to real-time user queries comprises determining that a response to a user query is classified as objectionable; and
suspending use of the chat bot based upon the response classification.

8. A system for verifying a chat bot comprising:
a processing unit configured to perform operations comprising:
receiving registration information for registration of a chat bot with a search engine, the registration information comprising keywords;
submitting predefined queries to the chat bot;
receiving responses to the predefined queries from the chat bot;
classifying the responses using a classifier to determine whether the responses match an inappropriate area that would disqualify the chat bot from registration;
upon verifying that the responses are classified as approved responses rather than being classified in an inappropriate area, registering the chat bot with the search engine by storing the registration information and completing registration of the chat bot based upon the verified responses;
after registering the chat bot, classifying one or more subsequent responses from the registered chat bot to real-time user queries to determine whether the subsequent responses match the inappropriate area;
receiving, at the search engine, a search query with a search keyword;
matching the search query to the keywords associated with the registered chat bot;
in accordance with a determination that the subsequent responses do not match the inappropriate area:
providing, by the search engine, search results based upon the search query, the search results including the link to the registered chat bot, and
upon user selection of the link, launching the registered chat bot; and
in accordance with a determination that the subsequent responses match the inappropriate area, preventing the registered chat bot from being included in search results provided by the search engine.

9. The system of claim 8, wherein the operations further comprise providing the predefined queries to the classifier to classify the responses.

10. The system of claim 9, wherein the predefined queries include a word objectionable to the classifier.

11. The system of claim 10, wherein the operations further comprise removing the word from the predefined queries before providing the predefined queries to the classifier.

12. The system of claim 10, wherein the operations further comprise removing the word from the responses before providing the responses to the classifier.

13. The system of claim 11, wherein the word is a curse word.

14. The system of claim 8, wherein classifying responses from the chat bot to real-time user queries comprises determining that a response to a user query is classified as objectionable, the operations further comprising suspending use of the chat bot based upon the response classification.

15. A non-transitory computer-readable storage medium storing computer-executable instructions for verifying a chat bot, the stored instructions comprising:
instructions to receive registration information for registering a chat bot with a search engine, the registration information comprising keywords;
instructions to submit predefined queries to the chat bot;
instructions to receive responses to the predefined queries from the chat bot;
instructions to classify the responses using a classifier to determine whether the responses match an inappropriate area that would disqualify the chat bot from registration;
instructions to register the chat bot with the search engine by storing the registration information and instructions to complete registration of the chat bot upon verifying that the responses are classified as approved responses rather than being classified in an inappropriate area;
instructions to classify one or more subsequent responses from the registered chat bot to real-time user queries to determine whether the subsequent responses match the inappropriate area after registering the chat bot;
instructions to match, upon receipt at the search engine of a search query with a search keyword, the search query to the keywords associated with the registered chat bot;
instructions to provide, by the search engine, search results based upon the search query in accordance with a determination that the subsequent responses do not match the inappropriate area, the search results including the link to the registered chat bot;
instructions to launch the registered chat agent upon user selection of the link; and
instructions to prevent the registered chat bot from being included in search results provided by the search engine in accordance with a determination that the subsequent responses match the inappropriate area.

16. The non-transitory computer-readable storage media of claim 15, wherein the instructions further comprise instructions to provide the predefined queries to the classifier to classify the responses.

17. The non-transitory computer-readable storage media of claim 16, wherein the predefined queries include a word objectionable to the classifier.

18. The non-transitory computer-readable storage media of claim 17, wherein the instructions further comprise instructions to remove the word from the predefined queries before providing the predefined queries to the classifier.

19. The system of claim 8, the operations further comprising:
updating the search results based on user interactions with the chat bot.

20. The system of claim 8, wherein the chat bot is launched within a search engine results page providing the search results without navigating away from the search engine results page.

21. The system of claim 8, wherein the registration information further comprises an a company name, a company phone, and a company website associated with the chat bot.

* * * * *